Sept. 25, 1945.  E. S. SCHNEIDER  2,385,588
COAT HANGER
Filed June 19, 1944
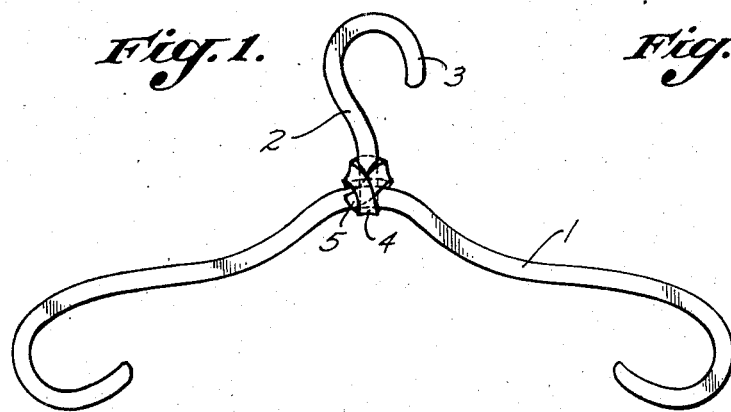
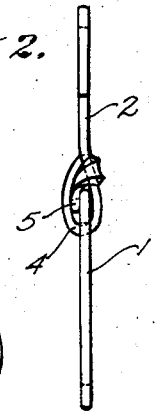
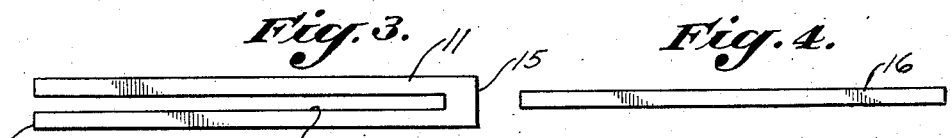
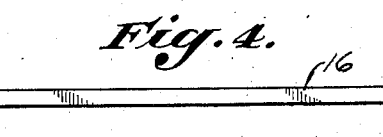
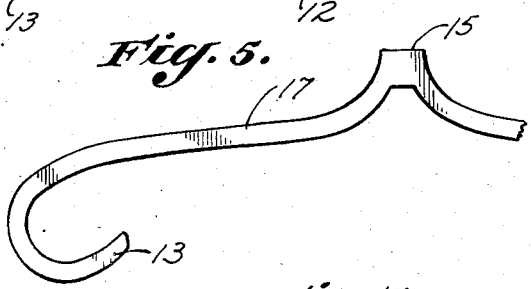
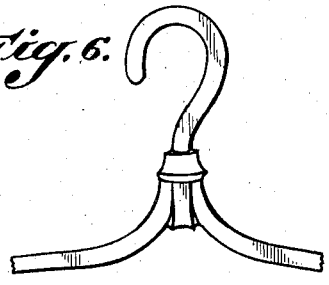
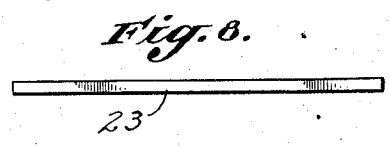
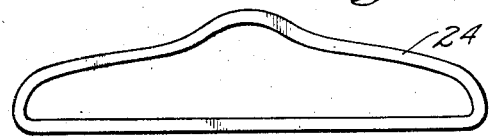
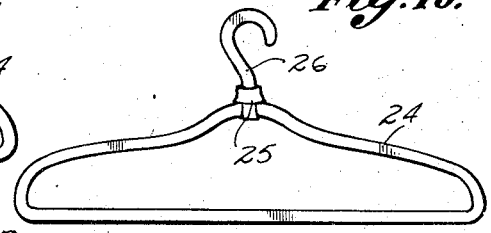
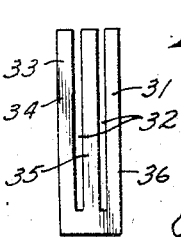
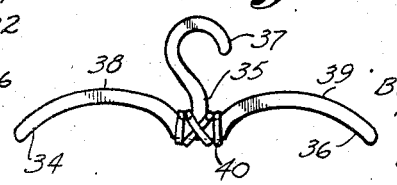
INVENTOR:
EUGENE S. SCHNEIDER,
BY HARRIS, KIECH, FOSTER & HARRIS,
Fred W Harris
FOR THE FIRM
ATTORNEYS.

Patented Sept. 25, 1945

2,385,588

UNITED STATES PATENT OFFICE 2,385,588

COAT HANGER

Eugene S. Schneider, Los Angeles, Calif.

Application June 19, 1944, Serial No. 540,955

1 Claim. (Cl. 223—88)

My invention relates to the art of forming various objects from sheets of material, the material being plastic or deformable when hot. There are many such materials available, and any material which can be cut or otherwise worked and which is flexible or deformable when hot and which sets into a rigid solid when cooled is suitable for my process.

The principal object of my invention is to provide a method by which relatively small pieces of plastic material can be formed or assembled in useful shapes.

To illustrate my invention, I will describe how such material can be used to make coat hangers.

Referring to the drawing, which is for illustrative purposes only,

Fig. 1 is a front view of a coat hanger made in accordance with my process and method;

Fig. 2 is a side view of same;

Figs. 3 and 4 show the material from which the coat hanger illustrated in Fig. 6 is formed;

Fig. 5 shows how the coat supporting portion of the coat hanger is formed prior to attaching the hook member;

Fig. 6 shows an alternative form of coat hanger embodying my invention;

Figs. 7 and 8 show the material from which the coat hanger illustrated in Fig. 10 is formed;

Fig. 9 shows how the material shown in Fig. 7 is deformed to form the coat and trouser supporting portion of the hanger;

Fig. 10 shows the complete hanger;

Fig. 11 shows how a piece of material is slotted to form the hanger shown in Fig. 12; and Fig. 12 shows the hanger as completely formed.

It will be noted that in the figures, Fig. 1 shows a coat hanger of general application; Fig. 6 is an alternative form of the same coat hanger; Fig. 10 is a view of a coat and trousers hanger; and Fig. 12 is a view of what may be called a baby hanger, that is, a hanger for babies' clothes.

In Fig. 1 I show a coat hanger formed from two pieces of plastic material, the piece 1 forming the coat supporting portion of the hanger, and the piece 2 forming the hook. Both of the pieces 1 and 2 are simply narrow strips of material which are cut from a sheet and which may be initially straight. The material is heated to a temperature at which it is readily deformable, and the piece 1 is formed in the shape shown in Fig. 1. The member 2 is then heated and a hook 3 formed thereon. The other end of the piece 2, while still hot, is looped around the coat supporting member 1, as shown at 4, and the end 5 is tucked under the loop 4 so as to form a knot. This knot is formed while the material is still flexible and deformable under the influence of heat, and the material is then cooled, which forms a rigid and tight knot. The same knot is used in the hangers shown in Figs. 6 and 10.

In forming the hanger shown in Fig. 6, a piece of material 11 is used, this material having a slot 12 formed therein, this slot extending through the end 13 of the piece 11 and to a point 14 short of but near the end 15. In Fig. 4 I show a piece 16 from which the hook 3 may be formed for the hangers shown in Figs. 1 and 6.

The slot 12 is formed by sawing or cutting the material, and after the material is so cut it is heated, and the material is bent into a coat supporting member 17 of the form shown in Fig. 5. The member 16 is then bent into a hook having the form shown at 3 in Fig. 1, and it is knotted about the coat supporting member 17 as shown in the drawing. As described in connection with the form of hanger shown in Fig. 1, the knot is formed while the material is still flexible and deformable, and upon cooling the knot hardens and forms a very permanent and satisfactory joint.

The hangers shown in Figs. 1 and 6 are simply coat hangers, there being no provision for also hanging a pair of trousers thereon. Such a coat and trousers hanger is shown in Fig. 10. In forming this hanger, a sheet of material 21, as shown in Fig. 7, has a slot 22 formed therein. The piece of material shown in Fig. 8 is simply a piece for forming the hook, this piece being shown at 23. After the slot is cut in the material, as shown in Fig. 7, the material is heated, and the coat and trousers supporting member 24 is formed. The member 23 is then formed into a hook 26, and the end is secured in the center of the member 24 by a knot 25, as previously explained.

The babies' clothes hanger, as shown in Fig. 12, is formed in a somewhat different manner from those previously explained. A sheet of material 31 has two slots 32 formed therein. The sheet of material 31 is rectangular in shape, and the slots 32 are parallel to each other and parallel to the sides 33 of the material 31. By so slotting the material, three tongues are formed, numbered 34, 35, and 36. The material is then heated, and the tongues 34 and 36 are bent over as shown to form clothes supporting members 38 and 39. The tongue 35 is then bent over to form a hook 37 as shown in Fig. 12. A small strip of material may be tied around the center of the hanger as shown at 40.

The principal features of novelty and utility in the invention are the use of a hook, such as the hook 3, which is formed from a straight piece of material, such as shown at 16, the material being of such a nature that it is deformable when hot but becomes rigid when cold. This material is bent in the form of the hook 3, and the lower end is tied around the center of the coat supporting member as shown in Figs. 1, 6, and 10. A further feature of novelty and utility is the formation of coat supporting members from a single sheet of material which is relatively narrow and rectangular in form, this being the piece of material shown in Fig. 3. The material is slotted, heated, and bent and then forms a coat supporting member having the form shown in Fig. 5, or the material may be slotted as shown in Fig. 7, and the coat and trousers supporting member, such as shown in Fig. 9, may be formed. In both of these cases the hook member is knotted around the center of the coat supporting member.

The novelty in Fig. 11 resides in making three tongues, using the central tongue to form a hook 37 as shown in Fig. 12, and bending over the two tongues 34 and 36 to form the coat supporting members 38 and 39.

I claim as my invention:

A coat hanger, comprising: a garment supporting member; and a suspension member made of a material which is deformable when hot but rigid when cold, said suspension member having a substantially rigid hook portion, an intermediate shank, and a tail portion, said tail portion being looped around under said garment supporting member from the rear thereof and overlying the front thereof and then extending rearwardly around the back of said shank portion and thence forwardly with its extremity tucked under said loop at the front of said garment supporting member.

EUGENE S. SCHNEIDER.